(12) United States Patent
Kang

(10) Patent No.: US 7,307,810 B1
(45) Date of Patent: Dec. 11, 2007

(54) METHOD OF COMPENSATING FOR TRACK ADDRESS DISCONTINUITY ACROSS SERVO TRACK WRITING BOUNDARY IN HARD DISK DRIVES

(75) Inventor: Chang-Ik Kang, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/545,130

(22) Filed: Oct. 9, 2006

(51) Int. Cl.
*G11B 5/55* (2006.01)

(52) U.S. Cl. .................................. 360/78.09; 360/78.14
(58) Field of Classification Search .................... None
See application file for complete search history.

(56) References Cited

U.S. PATENT DOCUMENTS

| | | | | |
|---|---|---|---|---|
| 5,233,486 A | * | 8/1993 | Albert | 360/78.14 |
| 5,844,744 A | * | 12/1998 | Suzuki et al. | 360/78.09 |
| 6,078,453 A | * | 6/2000 | Dziallo et al. | 360/78.06 |
| 6,414,809 B1 | * | 7/2002 | Sakai et al. | 360/60 |
| 6,678,109 B2 | * | 1/2004 | Kagami et al. | 360/78.14 |
| 7,012,773 B2 | * | 3/2006 | Ashikaga et al. | 360/78.14 |
| 7,184,230 B1 | * | 2/2007 | Chue et al. | 360/25 |

FOREIGN PATENT DOCUMENTS

JP      11073651 A    *    3/1999

* cited by examiner

*Primary Examiner*—Hoa T. Nguyen
*Assistant Examiner*—James L Habermehl
(74) *Attorney, Agent, or Firm*—Ben J. Yorks; Irell & Manella LLP

(57) ABSTRACT

A hard disk drive with a circuit that provides a current to a voice coil motor to move a head over a disk in a seek routine. The disk has track boundaries with discontinuities in track addresses. The circuit includes a state estimator that predicts a next state of the head. The state estimator sets an estimation error to zero when the head is over one of the track boundaries. The estimator then computes a predicted position that is used in a feed forward servo loop to generate a drive current. The drive current is provided to the voice coil motor to move the head across the disk.

14 Claims, 7 Drawing Sheets

METHOD OF COMPENSATING FOR TRACK ADDRESS DISCONTINUITY ACROSS SERVO TRACK WRITING BOUNDARY IN HARD DISK DRIVES

BACKGROUND OF THE INVENTION

1. Field of the Invention

The present invention relates to a seek routine of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of ((A–B)–(C–D)) to create a position error signal ("PES"). The PES is used to create a drive signal for the voice coil motor to position the head on the track.

The servo is written with a servo writer that writes the various servo bits across an essentially blank disk. The disk is sometimes divided into zones. The different zones may produce a dead zone of track addresses as shown in FIG. 2.

The disk drive can enter a seek routine to access data at different disk tracks. During a seek routine a requested address location is provided and a corresponding seek time and drive current are calculated to drive the voice coil motor and move the heads to the desired location. The servo of the disk drive is employed to center the head on the tracks and read the track identifications.

To optimize the servo process most drives utilize a feedforward servo loop. The feedforward loop may include a state estimator that predicts the expected location of the head(s) as it moves across the disk. The state estimator generates and utilizes an estimation error to predict the expected location of the head(s).

The track dead zones can cause a discontinuity in the servo process. FIG. 3 shows a spike in the estimation error at a track boundary. The spike causes unwanted seek acoustics. To account for the track dead zone, the estimation error is set to zero. But such an approach does not account for abrupt changes in the control input signal which leads to increased seek acoustic emission. It would be desirable to provide a servo that more adequately addresses track address discontinuities during a seek routine.

BRIEF SUMMARY OF THE INVENTION

A hard disk drive with a circuit that provides a current to a voice coil motor to perform a seek routine over a disk that has track boundaries. The circuit includes a state estimator that predicts a next state of the head. The state estimator sets an estimation error to zero when the head is over one of the track boundaries.

DETAILED DESCRIPTION

Described is a hard disk drive with a circuit that provides a current to a voice coil motor to move a head over a disk in a seek routine. The disk has track boundaries with discontinuities in track addresses. The circuit includes a state estimator that predicts a next state of the head. The state estimator sets an estimation error to zero when the head is over one of the track boundaries. The estimator then computes a predicted position that is used in a feed forward servo loop to generate a drive current. The drive current is provided to the voice coil motor to move the head across the disk.

Figure 4:
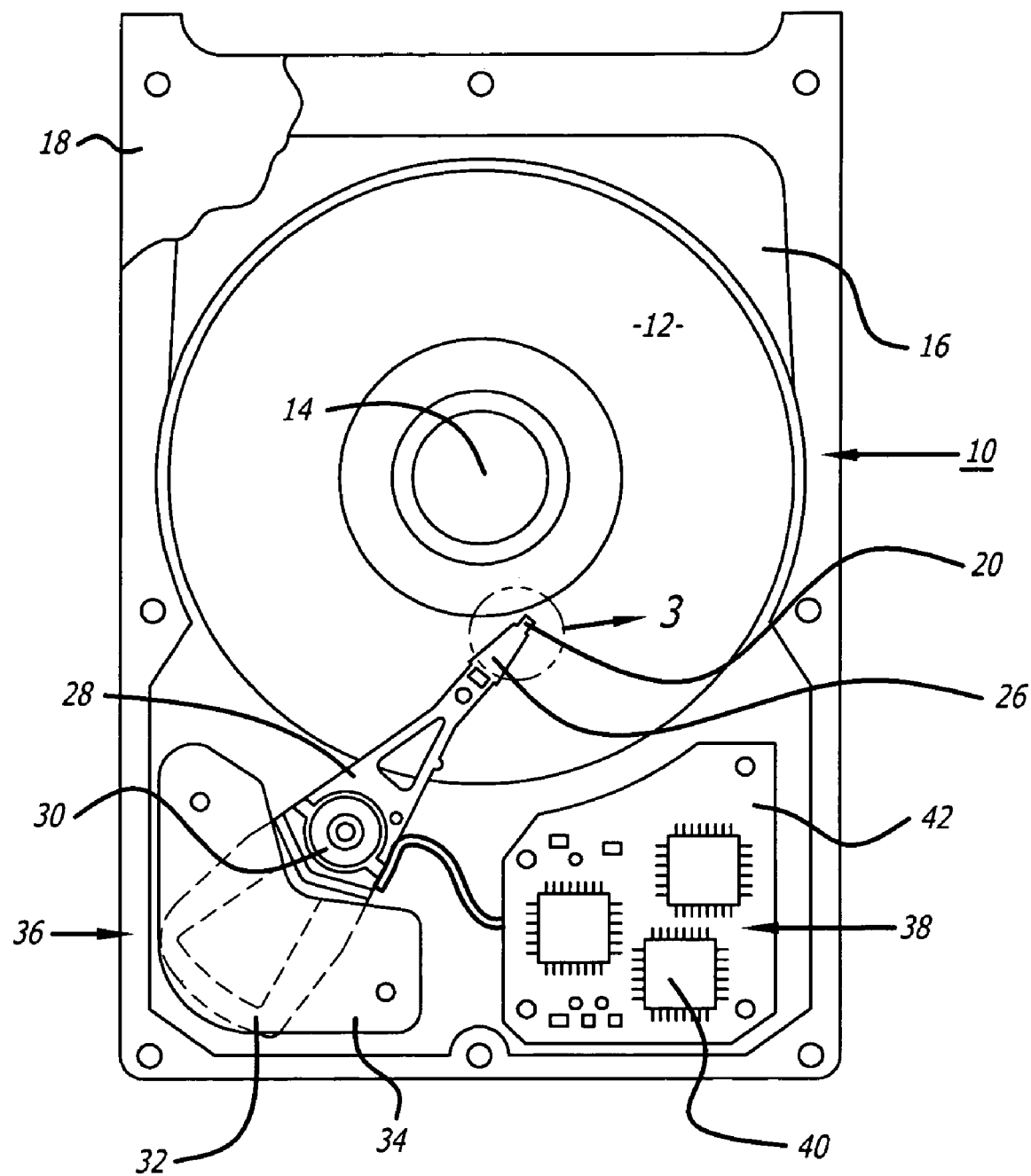
FIG. 4 is a top view of an embodiment of a hard disk drive.

Referring to the drawings more particularly by reference numbers, FIG. 4 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 5:
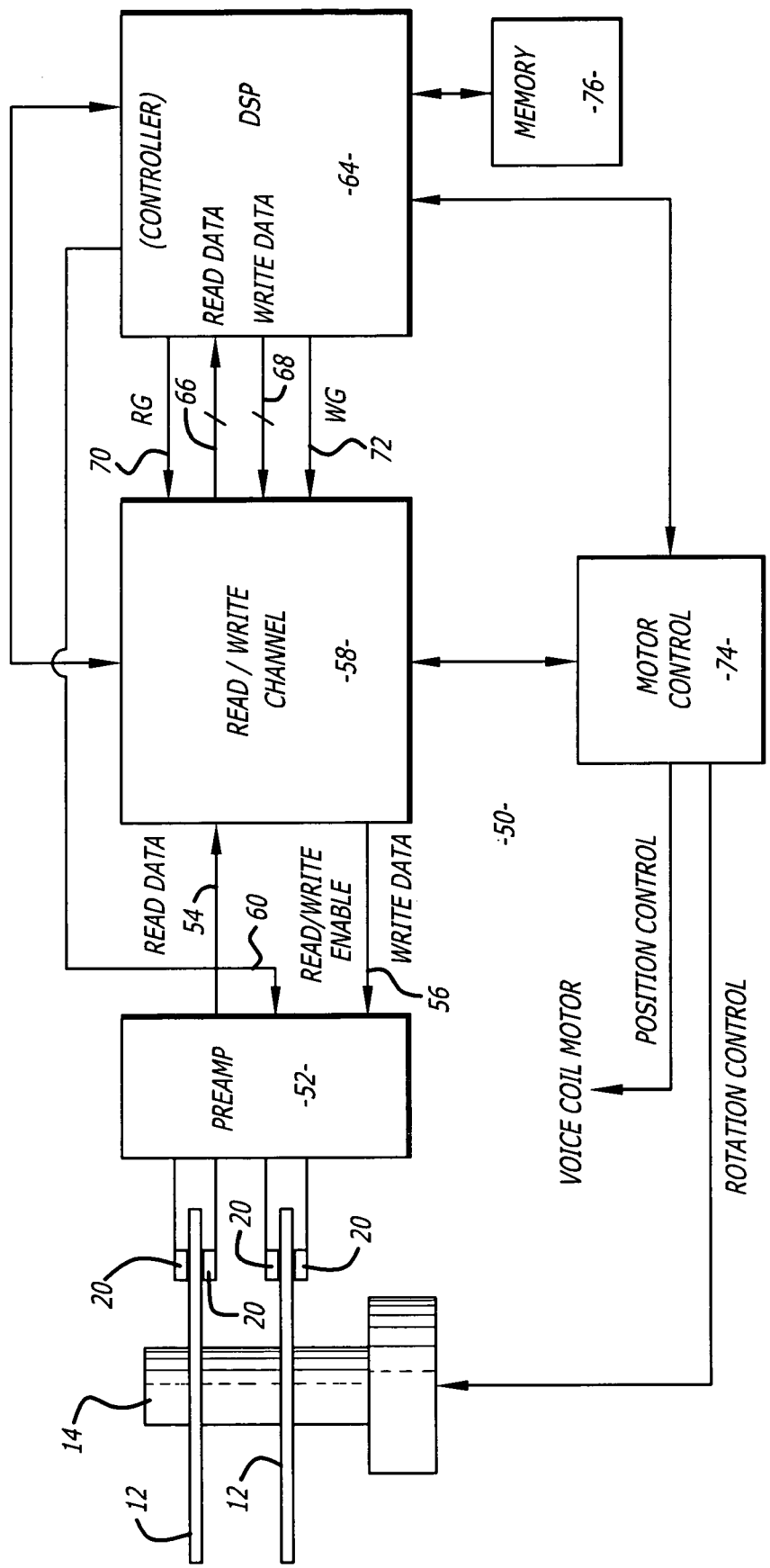
FIG. 5 is a schematic of an electrical circuit for the hard disk drive.

FIG. 5 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Figure 1:
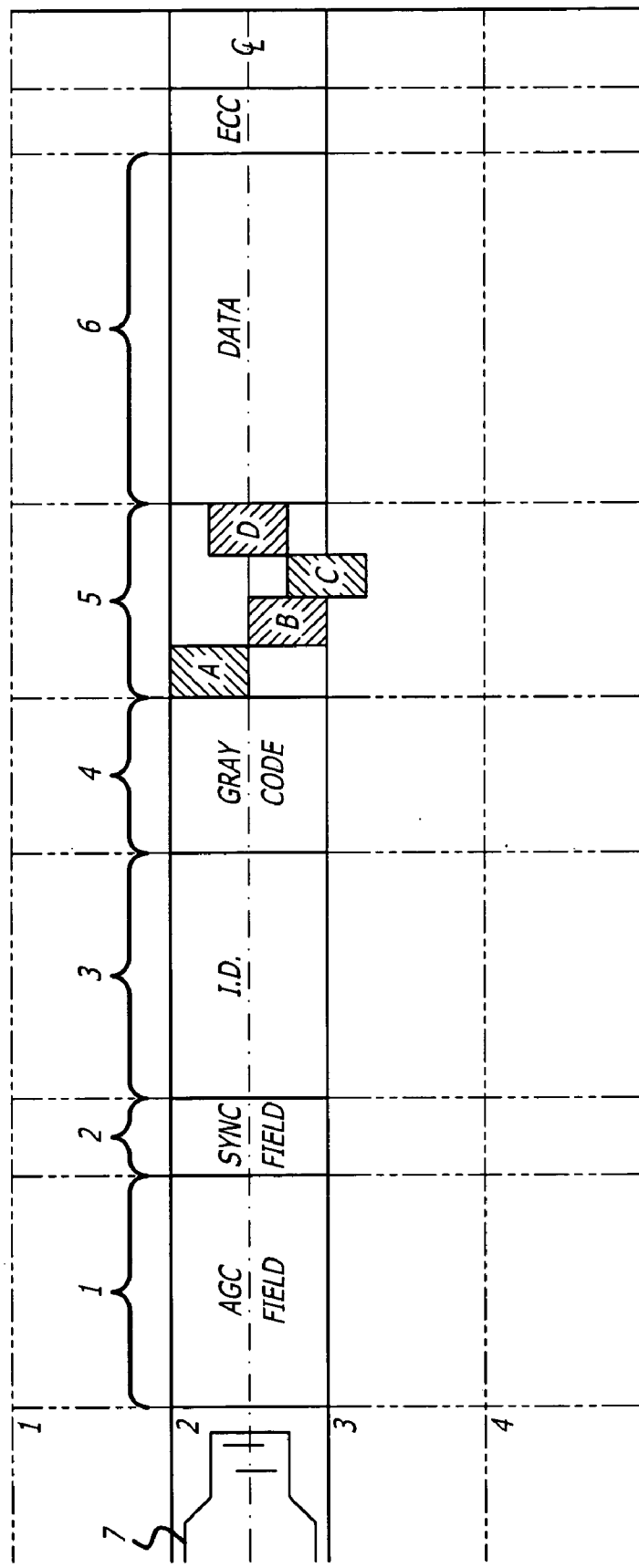
FIG. 1 is an illustration of a track of the prior art.
Figure 2:
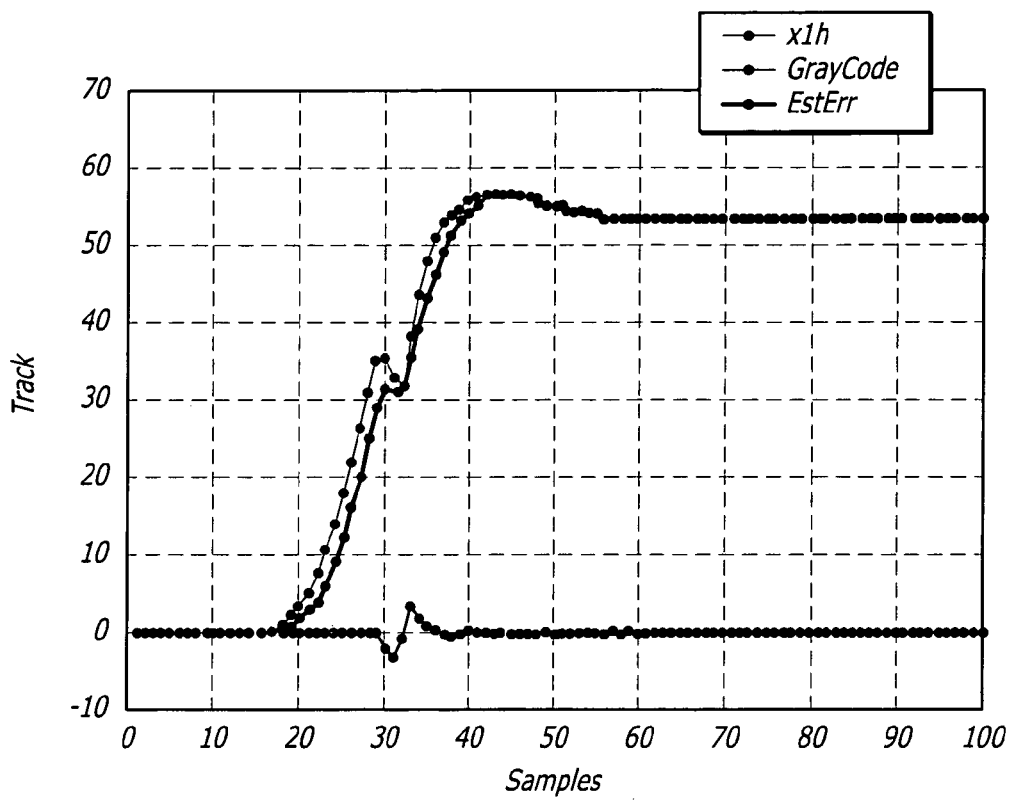
FIG. 2 is a graph showing a track address dead zone in a hard disk drive of the prior art.
Figure 3:
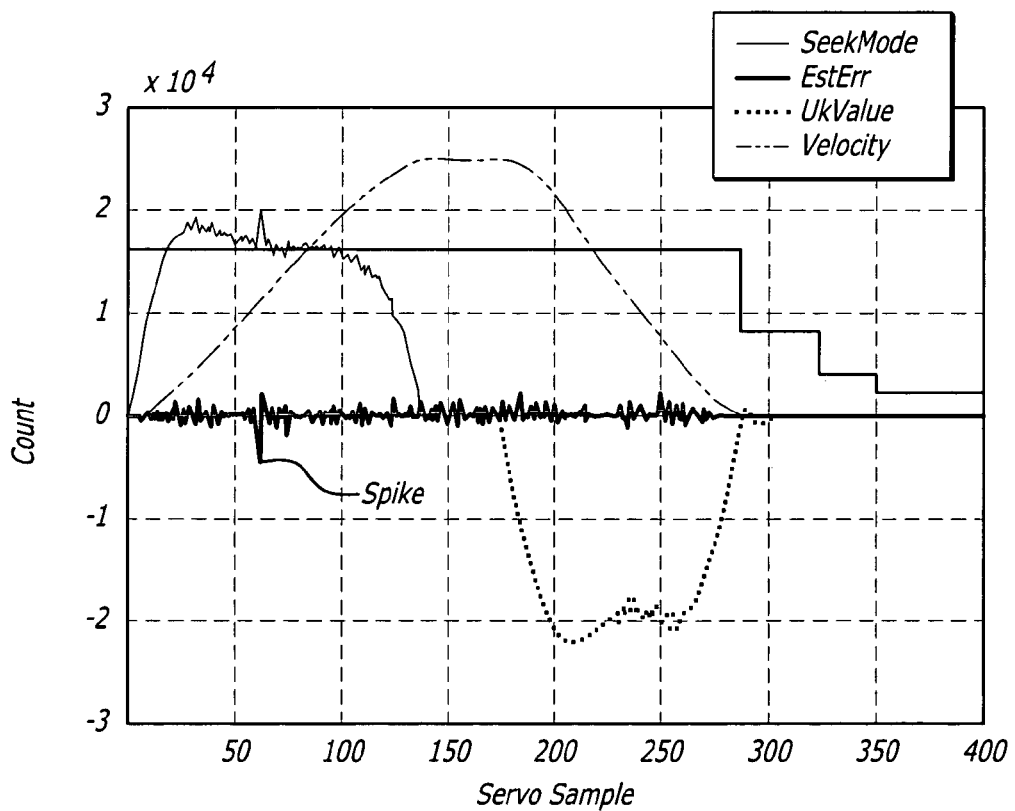
FIG. 3 is a graph showing spikes in an estimation error and a control input signal to a voice coil motor of a hard disk drive of the prior art.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

Figure 6:
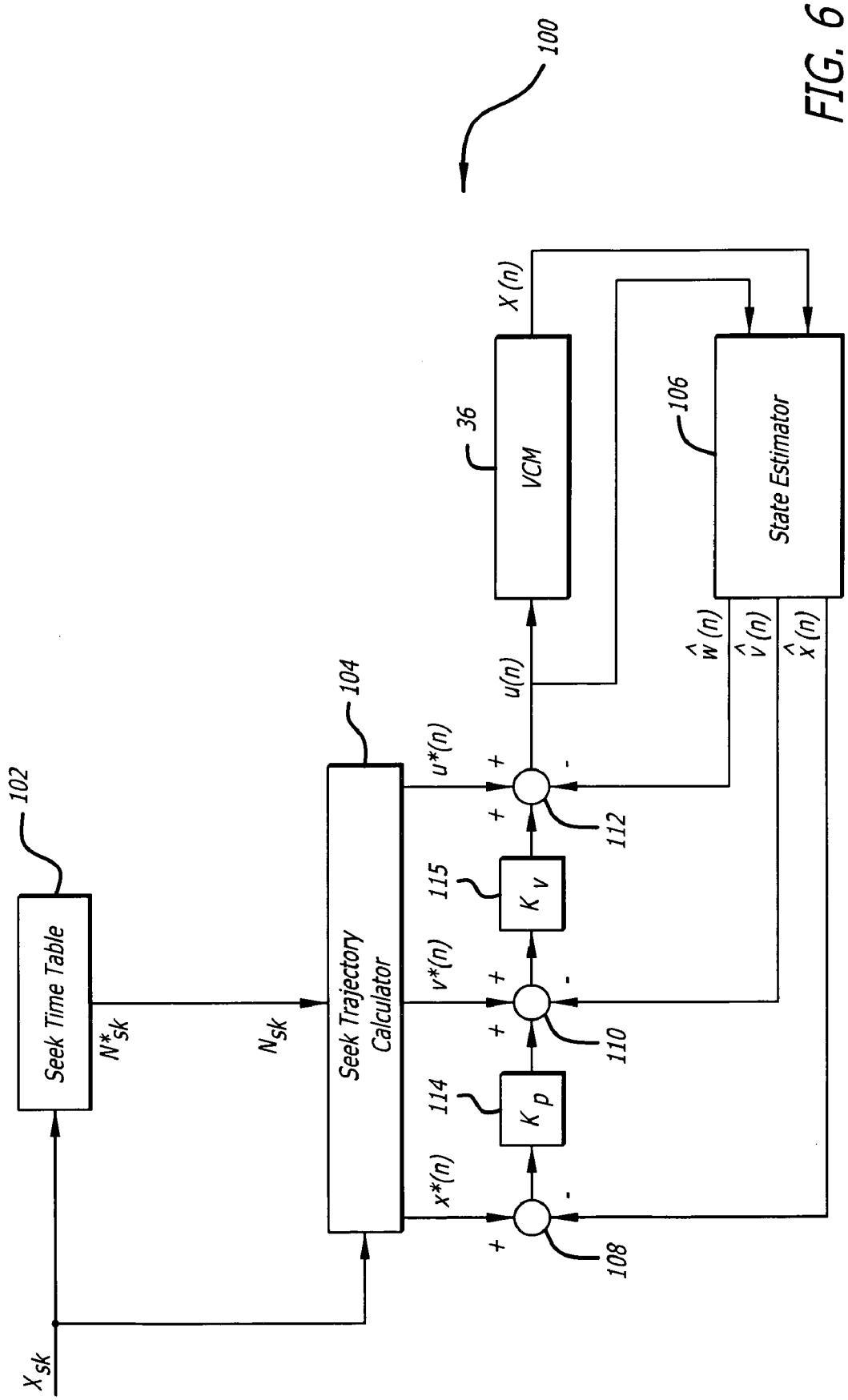
FIG. 6 is a schematic of a servo for the hard disk drive.

FIG. 6 shows a schematic of a servo 100 used to perform a seek operation. The servo is typically performed by the controller 64. In a seek operation the heads are moved from one track location to another track location. The seek distance $x_{sk}$ can be provided to a Seek Time Table 102 that provides a nominal seek time $N_{sk}$ from a predefined table. The Seek Trajectory Calculator 104 calculates a position trajectory x*(n), a velocity trajectory v*(n) and a drive current trajectory u*(n). The circuit may include a state estimator 106 that generates predicted values $\hat{x}(n)$, $\hat{v}(n)$ and $\hat{w}(n)$ based on the drive current u(n) and position x(n). The predicted values are provided to adders 108, 110 and 112. The outputs of adders 108 and 110 are provided to plant and voice coil motor transforms $K_p$ 114 and $K_v$ 116, respectively. The output of adder 112 is the current u(n) provided to the voice coil motor 36.

Because of anomalies in the servo writing process there may be areas of the disk that have discontinuities in the track addresses. These track boundaries or address dead zones can be predetermined and the locations can be stored in memory. When the drive enters a seek routine the heads are moved from one track to another track. The tracks are periodically sampled to read the track ID to determine the location of the head.

The head position y(n) is periodically measured every sampling period $T_s$. There is typically a delay time $T_d$ between the measured head position and the computation of a state position value x(n). The predicted state value $\hat{x}(n)$, predicted state value $\bar{x}(n+1)$ at a next state, and predicted output value $\bar{y}(n+1)$ at a next state can be computed from the following equations:

$$\hat{x}(n)=\bar{x}(n)+L[y(n)-\bar{y}(n)] \quad (1)$$

$$\bar{x}(n+1)=A_d\hat{x}(n)+B_d u(n) \quad (2)$$

$$\bar{y}(n+1)=C_d\bar{x}(n+1)+D_d u(n) \quad (3)$$

Where L is an estimation gain vector and the coefficients $A_d$, $B_d$, $C_d$ and $D_d$ can be computed from the following equations:

$$A_d = e^{A_c T_s},\ B_d = \int_0^{T_s} e^{A_c \tau} B_c d\tau, \quad (4)$$

$$C_d = C_c e^{-A_c T_d},\ D_d = -C_c \int_0^{T_d} e^{-A_c \tau} B_c d\tau$$

$A_c$, $B_c$ and $D_c$ can be derived from the equations and matrices of the classical voice coil motor model as follows:

$$\dot{x}(t) = A_c x(t) + B_c u(t),\ y(t) = C_c x(t) \quad (5)$$

$$\begin{bmatrix} \dot{x}(t) \\ \dot{v}(t) \\ \dot{w}(t) \end{bmatrix} = \begin{bmatrix} 0 & 1 & 0 \\ 0 & 0 & K_a \\ 0 & 0 & 0 \end{bmatrix} \begin{bmatrix} x(t) \\ v(t) \\ w(t) \end{bmatrix} + \begin{bmatrix} 0 \\ K_a \\ 0 \end{bmatrix} u(t),\ y(t) = [1\,0\,0] \begin{bmatrix} x(t) \\ v(t) \\ w(t) \end{bmatrix}$$

Figure 7:
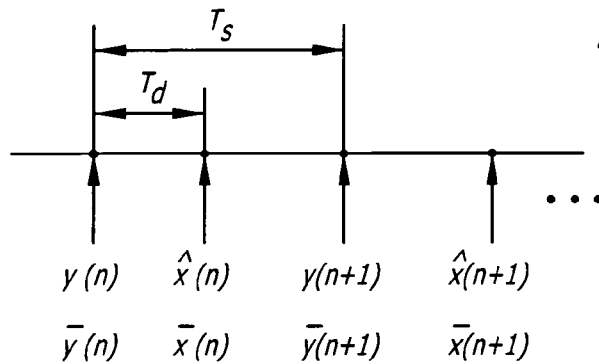
FIG. 7 is an illustration showing the timing of measured output and state positions.

$K_a$ is an acceleration constant. The timing of the measured output and state positions is shown in FIG. 7.

Figure 8:
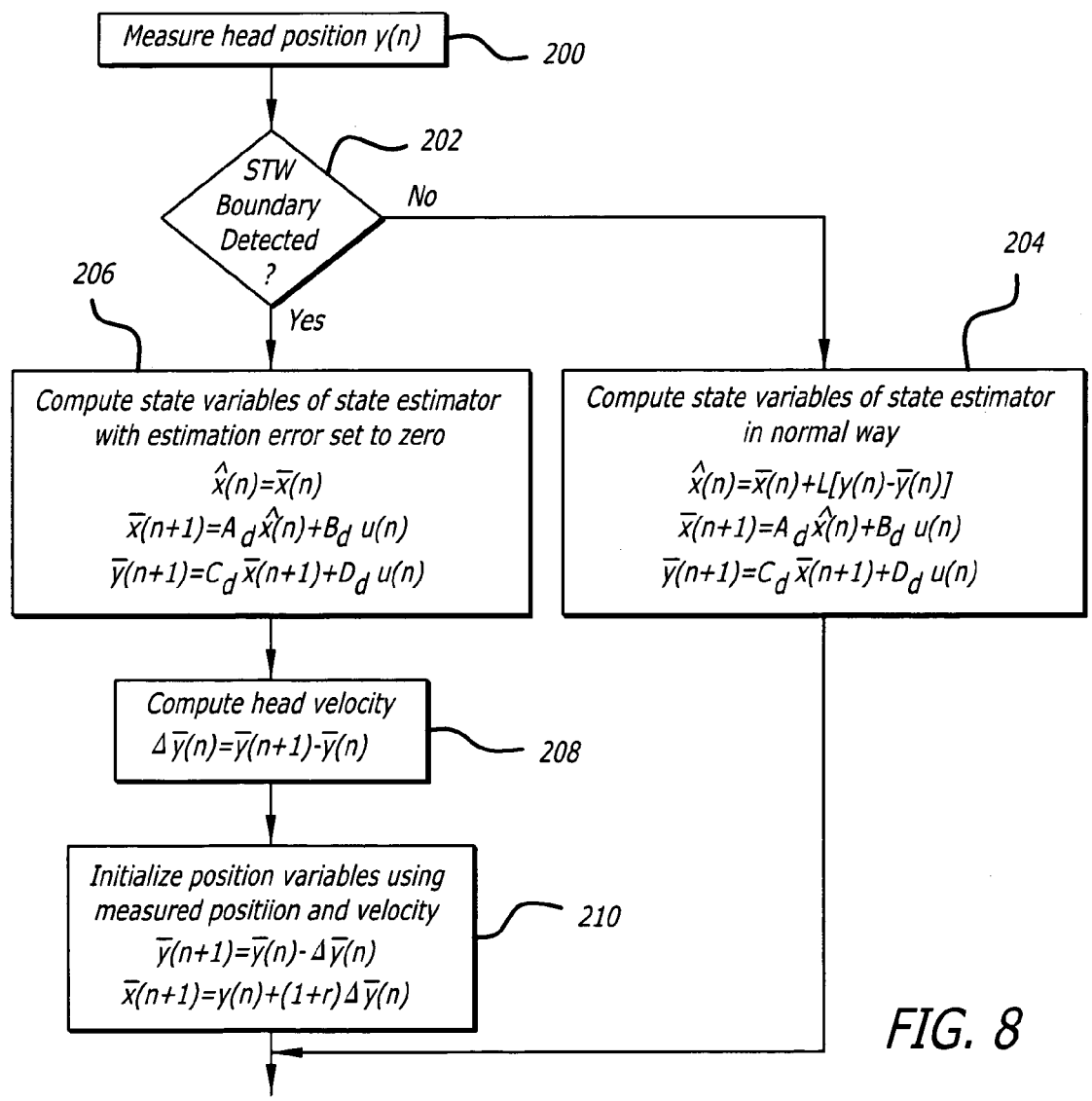
FIG. 8 is a flowchart showing a method that compensates for track address discontinuity.

FIG. 8 shows a method that compensates for track address discontinuities. In block 200 the head position y(n) is measured. It is then determined whether the head is at a track boundary that has an address discontinuity in decision block 202. If the head is not at a discontinuous track boundary then the state variables are computed in block 204.

If the head is at a discontinuous track boundary then the estimation error y(n)−$\bar{y}$(n) is set to zero and the state variables $\hat{x}$(n), $\bar{x}$(n+1) and $\bar{y}$(n+1) are computed in block 206. The estimated state is equal to the predicted state (i.e. $\hat{x}(n)=\bar{x}(n)$), because $\bar{y}$(n) is equal to the measured position y(n) when the error is set to zero. In block 208 a head velocity is computed by subtracting $\bar{y}$(n) from $\bar{y}$(n+1). Finally in block 210 the predicted measured output and state position for the next sample are computed with the following equations:

$$\bar{y}(n+1)=y(n)+\Delta\bar{y}(n) \quad (6)$$

$$\bar{x}(n+1)=\bar{y}(n+1)+r\Delta\bar{y}(n)=y(n)+(1+r)\Delta\bar{y}(n) \quad (7)$$

The predicted state position is used in the feed forward servo loop to generate the drive current that drives the voice coil motor and moves the heads.

Figure 9:
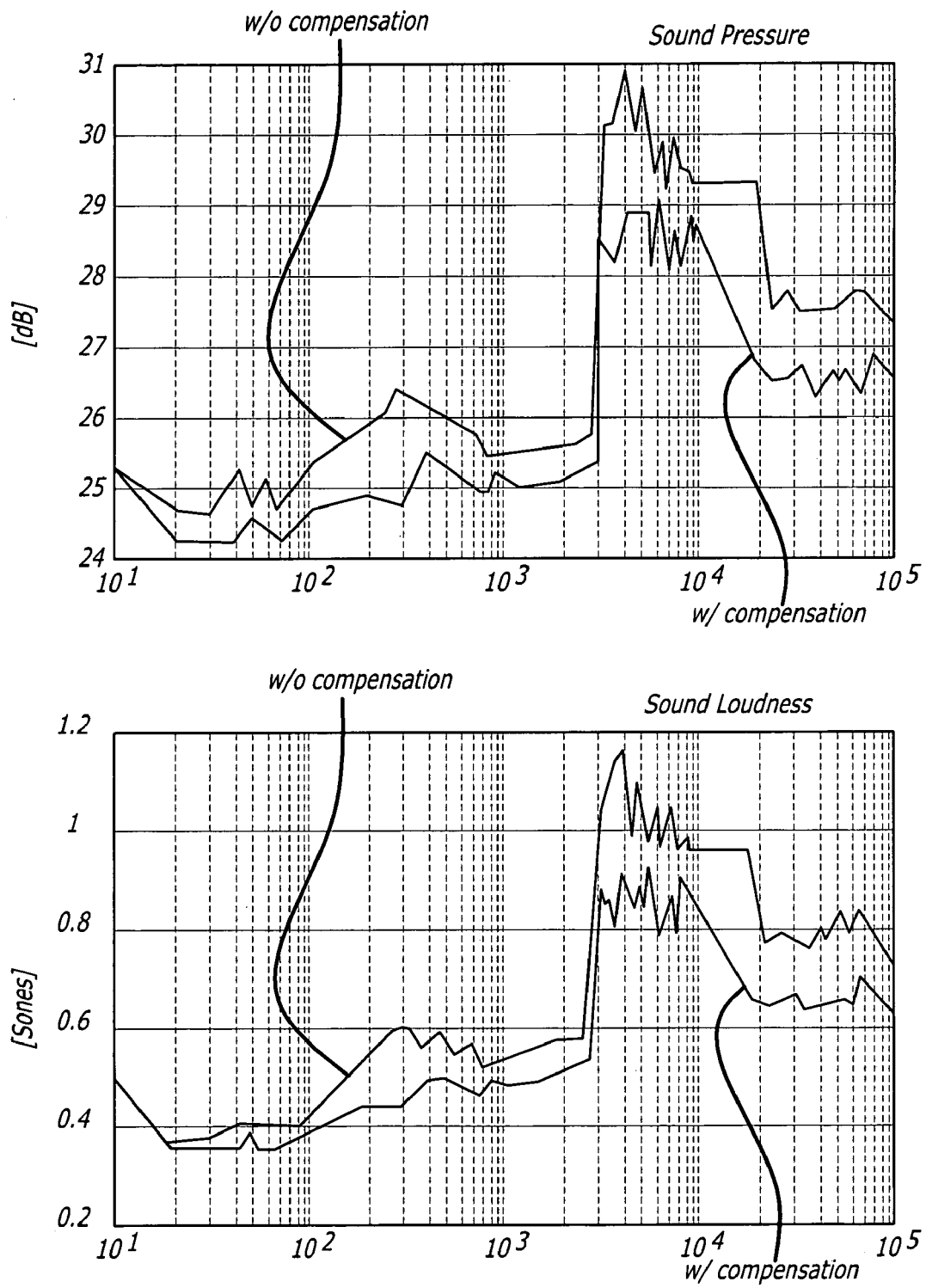
FIG. 9 are graphs showing acoustic curves during a servo routine comparing a prior method and the compensation method shown and described.

FIG. 9 shows a comparison between a disk drive operating with and without address boundary compensation. As shown by the graphs the inclusion of a method to compensate for track address discontinuities reduces the acoustic emissions within the drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
 a disk that contains a plurality of tracks and a track address discontinuity;
 a head coupled to said disk;
 an actuator arm coupled to said head;
 a voice coil motor coupled to said actuator arm; and,
 a circuit that provides a current to said voice coil motor to perform a seek operation to move said head across said disk, said circuit including a state estimator that predicts a next state of said head, said state estimator sets an estimation error to zero when said head is over said track address discontinuity.

2. The hard disk drive of claim 1, wherein said circuit computes within a sampling time, and with said estimation error set to zero, computes a head velocity, and a predicted head position for a next sample.

3. The hard disk drive of claim 2, wherein said circuit computes said predicted head position in accordance with the following equations:

$$\hat{x}(n)=\bar{x}(n)+L[y(n)-\bar{y}(n)]$$

$$\bar{x}(n+1)=A_d\hat{x}(n)+B_du(n)$$

$$\bar{y}(n+1)=C_d\bar{x}(n+1)+D_du(n).$$

4. The hard disk drive of claim 3, wherein said coefficients are computed with the following equations:

$$A_d = e^{A_c T_s}, B_d = \int_0^{T_s} e^{A_c \tau} B_c \, d\tau,$$

$$C_d = C_c e^{-A_c T_d}, D_d = -C_c \int_0^{T_d} e^{-A_c \tau} B_c \, d\tau.$$

5. The hard disk drive of claim 1, wherein said circuit includes a controller.

6. A hard disk drive, comprising:
a disk that contains a plurality of tracks and a track address discontinuity;
a head coupled to said disk;
an actuator arm coupled to said head;
a voice coil motor coupled to said actuator arm; and,
circuit means for providing a current to said voice coil motor to perform a seek operation to move said head across said disk and setting an estimation error to zero when said head is over said track address discontinuity.

7. The hard disk drive of claim 6, wherein said circuit means computes within a sampling time, and with said estimation error set to zero, computes a head velocity and a predicted head position for a next sample.

8. The hard disk drive of claim 7, wherein said circuit means computes said predicted head position in accordance with the following equations:

$$\hat{x}(n)=\bar{x}(n)+L[y(n)-\bar{y}(n)]$$

$$\bar{x}(n+1)=A_d\hat{x}(n)+B_du(n)$$

$$\bar{y}(n+1)=C_d\bar{x}(n+1)+D_du(n).$$

9. The hard disk drive of claim 8, wherein said, coefficients are computed with the following equations:

$$A_d = e^{A_c T_s}, B_d = \int_0^{T_s} e^{A_c \tau} B_c \, d\tau,$$

$$C_d = C_c e^{-A_c T_d}, D_d = -C_c \int_0^{T_d} e^{-A_c \tau} B_c \, d\tau.$$

10. The hard disk drive of claim 6, wherein said circuit means includes a controller.

11. A method for performing a seek routine in a hard disk drive, comprising:
determining a seek time to move at least one head across a disk;
determining a track address discontinuity of the disk; and,
setting an estimation error to zero;
determining a drive current; and,
providing the drive current to a voice coil motor to move the head across the disk.

12. The method of claim 11, further comprising computing a head velocity and a predicted head position for a next sample with the estimation error set to zero.

13. The method of claim 12, wherein the predicted head position is computed in accordance with the following equations:

$$\hat{x}(n)=\bar{x}(n)+L[y(n)-\bar{y}(n)]$$

$$\bar{x}(n+1)=A_d\hat{x}(n)+B_du(n)$$

$$\bar{y}(n+1)=C_d\bar{x}(n+1)+D_du(n).$$

14. The method of claim 13, wherein the coefficients are computed with the following equations:

$$A_d = e^{A_c T_s}, B_d = \int_0^{T_s} e^{A_c \tau} B_c \, d\tau,$$

$$C_d = C_c e^{-A_c T_d}, D_d = -C_c \int_0^{T_d} e^{-A_c \tau} B_c \, d\tau.$$

* * * * *